United States Patent
Cunningham

(10) Patent No.: US 10,791,683 B1
(45) Date of Patent: Oct. 6, 2020

(54) IRRIGATION UNIT STABILIZER

(71) Applicant: John R. Cunningham, Mason City, IL (US)

(72) Inventor: John R. Cunningham, Mason City, IL (US)

(*) Notice: Subject to any disclaimer, the term of this patent is extended or adjusted under 35 U.S.C. 154(b) by 0 days.

(21) Appl. No.: 16/380,573

(22) Filed: Apr. 10, 2019

Related U.S. Application Data

(60) Provisional application No. 62/664,301, filed on Apr. 30, 2018.

(51) Int. Cl.
*A01G 25/09* (2006.01)
*B05B 15/625* (2018.01)

(52) U.S. Cl.
CPC .......... *A01G 25/092* (2013.01); *B05B 15/625* (2018.02)

(58) Field of Classification Search
CPC .......... A01G 25/092; E02D 5/56; E02D 5/80; E02D 7/22; B05B 15/625
USPC .......... 239/728, 10, 711, 718–721
See application file for complete search history.

(56) References Cited

U.S. PATENT DOCUMENTS

| | | | |
|---|---|---|---|
| 2014/0371971 A1* | 12/2014 | Welch | A01G 25/092 701/23 |
| 2017/0000047 A1* | 1/2017 | Binder | A01G 25/092 |

FOREIGN PATENT DOCUMENTS

WO    WO 2016/089222 A1 *  6/2016

* cited by examiner

*Primary Examiner* — Qingzhang Zhou
(74) *Attorney, Agent, or Firm* — Philip L. Bateman

(57) ABSTRACT

A center pivot irrigation unit with a plurality of towers supporting an elevated water line has a pair of stabilizers for each tower, one of which extends in a forward direction from the tower and one of which extends in a rearward direction from the tower. Each stabilizer has a distal end that is suspended a short distance above the bottom of the wheels so the stabilizer does not contact the field unless the unit begins to tip.

6 Claims, 2 Drawing Sheets

IRRIGATION UNIT STABILIZER

CROSS-REFERENCE TO RELATED APPLICATION

This application claims the benefit of U.S. Provisional Application Ser. No. 62/664,301, Apr. 30, 2018.

FIELD OF THE INVENTION

This invention relates to irrigation for horticultural purposes. More particularly, this invention relates center pivot irrigation units.

BACKGROUND OF THE INVENTION

Growing crops are irrigated in many different ways. One common type of irrigation equipment is a center pivot unit. Center pivot units have a stationary center having a source of underground water, typically a well, and a source of electrical power. The water flows upward through a center vertical post and then outward through an elevated horizontal line. The elevated line is supported by multiple wheeled A-frame towers, each of which is powered by an electric or hydraulic motor. The A-frame towers have two inline wheels to minimize the amount of ground that cannot be used for crops. Sprinkler outlets are spaced along the elevated line. The entire unit slowly rotates about the center pivot point and evenly supplies water to a large circular-shaped portion of a field. A compete rotation of the unit generally takes several hours to several days. Center pivot irrigation units often contain three or more towers and extend hundreds of feet.

High winds can topple center pivot irrigation units. If a unit topples, costly damage to the unit results. The toppled unit also damages the growing crop and the ground where it falls. Repairing a toppled center pivot irrigation unit takes time and having the unit out of service for an extended period of time can jeopardize the entire crop in the field serviced by the unit.

Binder, U.S. Pat. Appln. No. 2017/0000047, Jan. 5, 2017, discloses a center pivot irrigation unit that is resistant to toppling in high winds. Each tower of the unit has two pivoting arms that are transverse to the elevated line, one that extends forwardly (referred to as circumferential) and one that extends rearwardly (referred to as counter-circumferential). Each pivoting arm has a wheel, slide, or skid at its distal end. The pivoting arms are normally folded against the towers, but are deployed during periods of high winds. When deployed, the wheels or other ground contacting members on the pivot arm travel along the same path as the wheels of the tower.

The Binder center pivot unit effectively resists toppling over when the pivot arms are deployed, but suffers from numerous disadvantages. First, the pivot arms cannot be left deployed at all times because the wheels or other ground contacting members create an additional drag on the unit that consumes power. Therefore, the pivot arms must be deployed during periods of high wind and then retracted during other times. This requires either a complicated automatic system that measures wind speed or the vigilance of an operator. Second, the pivot arms must be deployed manually or by the use of an electrical actuator. Requiring an electrical actuator for each pivot arm adds to the cost, complexity, and maintenance requirements of the center pivot unit.

Accordingly, there is a demand for an improved center pivot irrigation unit that resists toppling over during high wind and that has no moving parts and has no effect on the operation of the unit unless the unit begins to topple.

SUMMARY OF THE INVENTION

The general object of this invention is to provide an improved center pivot irrigation unit that resists toppling over during high wind and that has no moving parts and has no effect on the operation of the unit unless the unit begins to topple.

I have invented an improved center pivot irrigation unit for rotating about a center and for irrigating a circular area in a field. The unit comprises: (a) a center tower having a vertical water line; (b) a pivoting, horizontal, linear, elevated water line communicating with the vertical water line and extending therefrom; (c) a plurality of spaced apart sprinkler lines communicating with the elevated water line; (d) a plurality of spaced apart, powered, wheeled A-frame towers supporting and rotating the elevated water line about the center tower in a forward direction, the wheels contacting a field along a plane defined by the bottom of the wheels; and (e) a pair of stabilizers on at least one tower, one of which stabilizers extends in a forward direction from the tower and one of which stabilizers extends in a rearward direction from the tower, each stabilizer having a distal end that is suspended a short distance above the bottom of the wheels so the stabilizer does not contact the field unless the unit begins to tip.

The center pivot irrigation unit of this invention resists toppling over during high wind, has no moving parts, and has no effect on the operation of the unit unless the unit begins to topple.

DETAILED DESCRIPTION OF THE INVENTION

Figure 1:
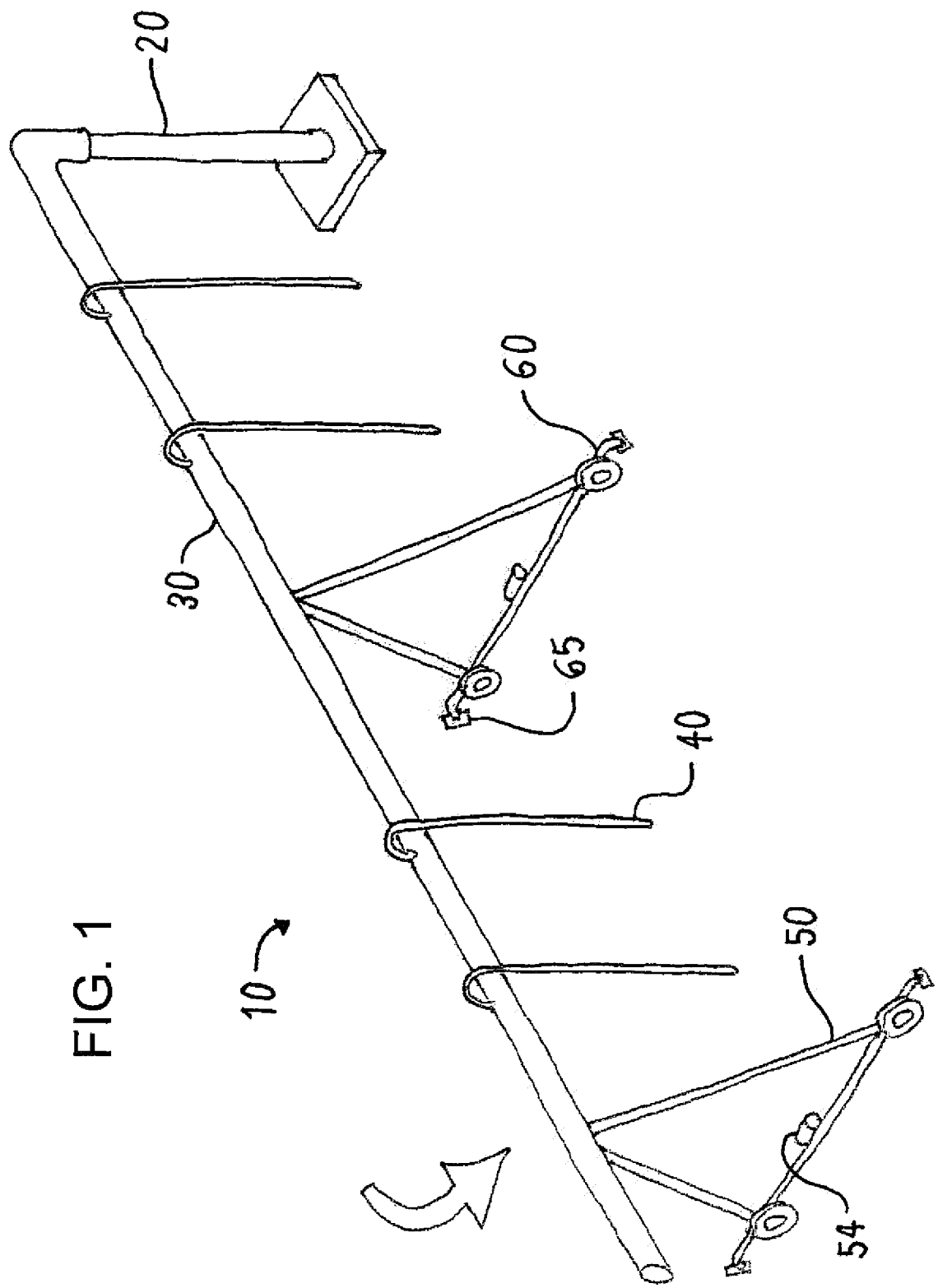
FIG. 1 is a perspective view of a preferred embodiment of the center pivot irrigation unit of this invention.

This invention is best understood by reference to the drawings. Referring to FIG. 1, a preferred embodiment of the center pivot irrigation unit 10 of this invention comprises a center tower 20, an elevated water line 30, a plurality of sprinkler lines 40, a plurality of towers 50, and a pair of stabilizers 60 and 65 for each tower. The large arrow indicates the direction of rotation of the irrigation unit. The components of the irrigation unit are discussed in more detail below.

The center tower 20 has a vertical water line that is supplied by a source of water, typically an underground line or a well. The vertical water line is supported by a frame (not shown for clarity) that sits upon a foundation. The center tower is conventional.

The elevated water line 30 communicates with the vertical water line and pivots (rotates) around it. The elevated water line is generally linear and generally horizontal. The elevated water line is generally about 500 to 5000 feet in length and is generally about 2 to 10 inches in diameter. Unless otherwise indicated expressly or by context, the term "about" is used herein to mean plus or minus 25 percent of the measurement or other quantified property referenced. The elevated water line is conventional.

A plurality of sprinkler lines 40 communicate with the elevated water line. The sprinkler lines are spaced apart sufficiently to provide an even supply of water to the ground along the length of the elevated water line. The sprinkler lines preferably have nozzles at their distal ends to provide a greater dispersal of water. In the embodiment shown, the sprinkler lines descend from the elevated water line and end a short distance above ground level. In other embodiments, the sprinkler lines are located at or near the elevated water line. The sprinkler lines are conventional.

A plurality of towers 50 support the elevated water line. Each tower has an A-shaped frame with two angled uprights 51 and a horizontal cross member 52. Two inline wheels 53 are located at or near the ends of the horizontal member. One or both of the wheels is powered by a motor 54 mounted on the horizontal member. The motor drives the wheel(s) through a drivetrain (not shown for clarity). The towers are generally located at intervals of about 100 to 200 feet and are generally about eight to twenty feet in height. Center pivot irrigation units typically contain about three to fifty towers. The towers are conventional with the exception that the horizontal members preferably extend beyond the wheels a short distance to help act as stabilizers, as described in detail below. In most conventional towers, the wheels are positioned at the ends of the horizontal members.

At least one of the towers has a pair of stabilizers to reduce or eliminate the possibility of toppling during high winds. Each tower preferably has a pair of stabilizers. A front stabilizer 60 extends in a forward direction from the tower and a rear stabilizer 65 extends in a rearward direction from the tower. The stabilizers are thus generally collinear with the horizontal cross member of the tower and are generally transverse (perpendicular) to the elevated water line. Each stabilizer has a distal end that is suspended a short distance above the ground (i.e., above the plane defined by the bottom of the wheels) where the wheels travel. This area, commonly known as the wheel rut or wheel track, is relatively flat and well compacted.

The distance which the distal end extends horizontally beyond the wheel and the distance the distal end is suspended above the ground are matters of choice. Other things being equal, the ability of the stabilizers to prevent tipping increases as the distance of extension increases and as the distance above the ground decreases. However, the weight and cost of the stabilizer increases as the distance of extension increases and the possibility of inadvertent contact with the ground increases as the distance above the ground decreases. The distance the distal end extends outwardly beyond the wheel (as measured from the axle and either forwardly or rearwardly) is generally about one to twelve feet, is preferably about two to ten feet, and is most preferably about three to eight feet. The distance the distal end is suspended above the ground is generally about two to twenty-four inches, is preferably about three to eighteen inches, and is most preferably about four to twelve inches. The optimal distance is a function of the length of the stabilizers with the optimal distance increasing as the length of the stabilizer increases. The distance is measured based on the tower being on a solid flat surface.

Figure 2:
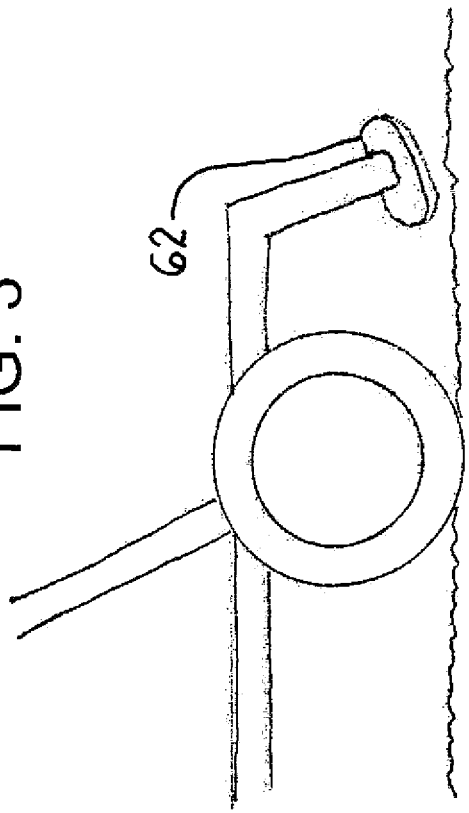
FIG. 2 is a detailed side view thereof showing a stabilizer.
Figure 3:
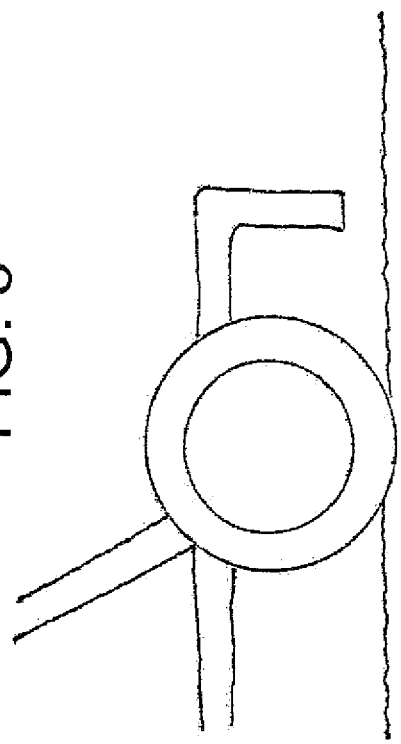
FIG. 3 is a detailed side view showing an alternate stabilizer.
Figure 4:
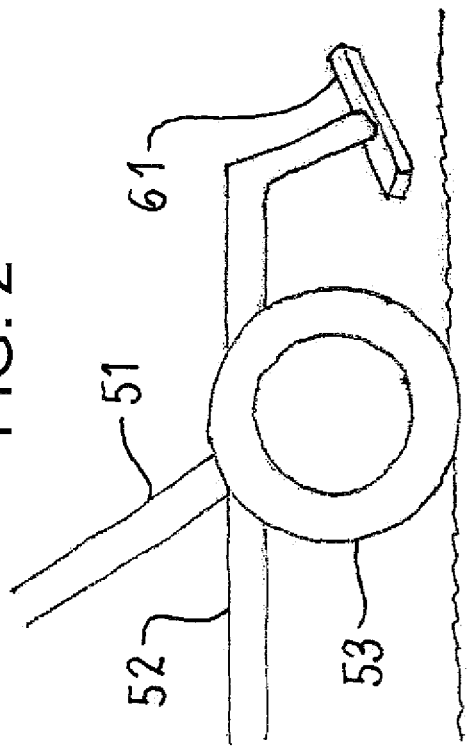
FIG. 4 is a detailed side view showing another alternate stabilizer.
Figure 5:
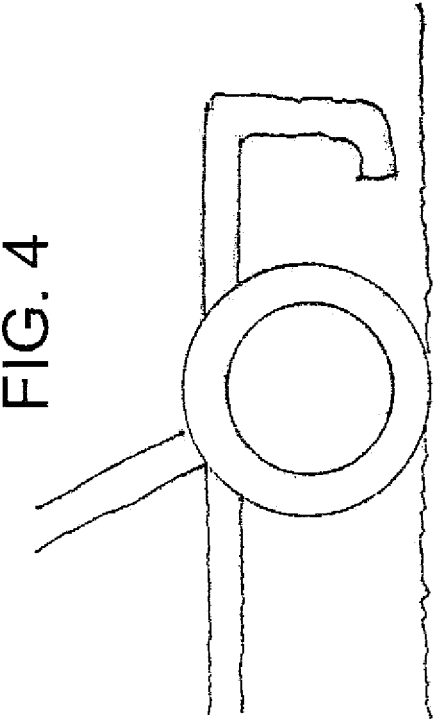
FIG. 5 is a detailed side view showing another alternate stabilizer.

The structure of the stabilizer is also a matter of choice. The stabilizer is generally an extension of the horizontal member of the frame, but can be a separate item if desired or if the stabilizer is retrofitted to an existing unit. If retrofitted, the extension is generally attached to the outside of the horizontal member or inserted into the horizontal member. The configuration of the distal end of the stabilizer is also a matter of choice. In the embodiment shown in FIG. 1, the distal end of the stabilizer contains a rectangular plate 61 that provides additional surface area for contacting the ground. The plate is shown in more detail in FIG. 2. The front and rear stabilizers are generally identical so only one stabilizer is shown. The plate is oriented so it is parallel to the ground if the unit begins to topple. The geometry depends, of course, on the location of the distal end of the stabilizer. In the embodiment shown in FIG. 3, the distal end of the stabilizer contains a rounded plate 62 that is circular, oblong, oval, or the like. In the embodiment shown in FIG. 4, the distal end of the stabilizer angles back toward the wheel. In the embodiment shown in FIG. 5, the distal end of the stabilizer terminates without any added structure to increase surface area.

The center pivot irrigation unit of this invention is used in a conventional manner. The stabilizers on the towers do not interfere with or otherwise affect performance of the unit during normal operation. However, if high winds begin to topple the unit, the stabilizers contact the ground and resist toppling.

The tower-mounted stabilizers are also useful on lateral irrigation units. Lateral irrigation units are similar to center pivot irrigation units except they travel in a straight line across a field. Lateral irrigation units are useful in fields that are not square in shape. For example, a long narrow field may better serviced with a single lateral irrigation unit that one or more center pivot irrigation units.

I claim:

1. A center pivot irrigation unit for rotating about a center and for irrigating a circular area in a field, the center pivot irrigation unit comprising:
   (a) a center tower having a vertical water line;
   (b) a pivoting, horizontal, linear, elevated water line communicating with the vertical water line and extending therefrom;
   (c) a plurality of spaced apart sprinkler lines communicating with the pivoting, horizontal, linear, elevated water line;
   (d) a plurality of spaced apart, powered, A-frame towers on a plurality of wheels having lower surfaces supporting and rotating the pivoting, horizontal, linear, elevated water line about the center tower in a forward direction, the plurality of wheels contacting the field along a plane defined by a bottom of the plurality of wheels; and
   (e) a pair of stabilizers on at least one tower of the plurality of spaced apart, powered, A-frame towers, one of the pair of stabilizers extending in the forward direction from the at least one tower and one of the pair of stabilizers extending in a rearward direction from the at least one tower, each stabilizer of the pair of stabilizers comprising an extension with no moving parts, wherein the extension having an angled portion extending toward the field and having a distal end that is suspended above a horizontal plane defined by the lower surfaces of the plurality of wheels a distance of two to twenty-four inches so the pair of stabilizers do not contact the field unless the center pivot irrigation unit begins to tip when exposed to an elevated transverse wind and so the pair of stabilizers do not affect performance of the center pivot irrigation unit unless the center pivot irrigation unit begins to tip, wherein the distal end of the angled portion of the extension of each said stabilizer of the pair of stabilizers contains a plate.

2. The center pivot irrigation unit of claim 1 wherein each of the plurality of spaced apart, powered, A-frame towers has the pair of stabilizers.

3. The center pivot irrigation unit of claim 1 wherein the plate is parallel to the plane defined by the bottom of the plurality of wheels.

4. The center pivot irrigation unit of claim 1 wherein each of the plurality of spaced apart, powered, A-frame towers comprises a front wheel of the plurality of wheels, a rear wheel of the plurality of wheels, and a horizontal cross member that extends past the front wheel and the rear wheel to form at least a part of the pair of stabilizers.

5. The center pivot irrigation unit of claim 1 wherein each of the pair of stabilizers extends outwardly from the plurality of wheels a distance of one to ten feet.

6. The center pivot irrigation unit of claim 1 wherein the distal end of the extension of each said stabilizer of the pair of stabilizers that is suspended above the horizontal plane defined by the lower surfaces of the plurality of wheels the distance of three to eighteen inches.

\* \* \* \* \*